United States Patent [19]

Hertzel et al.

[11] Patent Number: 4,758,705

[45] Date of Patent: Jul. 19, 1988

[54] METHOD AND APPARATUS FOR TEXTURING A ROLLER

[75] Inventors: Gerald T. Hertzel; Gerald F. Pickens; Matthew J. Visbaras, all of Rochester, N.Y.

[73] Assignee: Eastman Kodak Company, Rochester, N.Y.

[21] Appl. No.: 109,647

[22] Filed: Oct. 19, 1987

Related U.S. Application Data

[62] Division of Ser. No. 762,898, Aug. 6, 1985, Pat. No. 4,734,729.

[51] Int. Cl.$^4$ .............................................. B23K 26/00
[52] U.S. Cl. ............................. 219/121.6; 219/121.61; 219/121.85
[58] Field of Search ....... 219/121 L, 121 LM, 121 EB, 219/121 EM, 121 P, 121 PY, 121 EF, 121 EG, 121 LE, 121 LF, 121 LW, 121 LA

[56] References Cited

U.S. PATENT DOCUMENTS

| | | | |
|---|---|---|---|
| 444,597 | 1/1891 | Lichtenstadt et al. | 128/24.1 |
| 1,730,520 | 10/1929 | McMurray | 29/121.2 |
| 1,938,444 | 12/1933 | Vedder | 29/121.2 X |
| 2,023,019 | 12/1935 | Heppes | 118/DIG. 15 X |
| 2,131,777 | 10/1938 | Willcox | 29/121.2 X |
| 2,577,129 | 12/1951 | Johnston et al. | 128/57 |
| 2,638,050 | 5/1953 | King | 118/DIG. 15 X |
| 2,724,493 | 11/1955 | Jones | 198/230 |
| 3,177,558 | 4/1965 | Gronholz | 29/121 |
| 3,261,288 | 7/1966 | Dickerson | 118/DIG. 15 X |
| 3,303,319 | 2/1967 | Steigerwald | 219/121 EB |
| 3,339,818 | 9/1967 | Morrow | 29/121.2 X |
| 3,404,254 | 10/1968 | Jones | 219/121 LU X |
| 3,419,321 | 12/1968 | Barber et al. | 219/121 LX X |
| 3,447,221 | 6/1969 | Odiorne | 29/121.1 |
| 3,586,816 | 6/1971 | Hagen | 219/121 LT X |
| 3,626,143 | 12/1971 | Fry | 219/121 LN |
| 3,790,744 | 2/1974 | Bowen | 219/121 LJ |
| 3,878,353 | 4/1975 | Anderson | 219/69 M |
| 3,955,260 | 5/1976 | Sherden | 29/121 R |
| 4,028,523 | 6/1977 | Anderl et al. | 219/121 EM |
| 4,110,152 | 8/1978 | Dunning et al. | 29/121.2 |
| 4,131,782 | 12/1978 | Einstein et al. | 219/121 LM |
| 4,147,425 | 4/1979 | Friedman et al. | 219/69 R |
| 4,200,382 | 4/1980 | Friedman | 219/121 L |
| 4,319,827 | 3/1982 | Carter et al. | 354/86 |
| 4,322,600 | 3/1982 | Crahay | 219/121 LH X |
| 4,323,401 | 4/1982 | Belke et al. | 148/39 |
| 4,377,736 | 3/1983 | Daunt et al. | 219/121 LH |
| 4,460,255 | 7/1984 | Kozai et al. | 354/86 |
| 4,533,815 | 8/1985 | Ecer | 219/121 LF |
| 4,628,179 | 12/1986 | Crahay | 219/121 LJ X |

FOREIGN PATENT DOCUMENTS

962337 2/1975 Canada .
2029308A 3/1980 United Kingdom .
2040824A 9/1980 United Kingdom .

OTHER PUBLICATIONS

A. A. Antonov et al, entitled "A Steady–State Crater Formed as a Result of Interaction of High Power CW $CO_2$ Laser Radiation with Metals and Liquids, Soviet Journal Quantum Electronics 7(8) Aug. 1977, pp. 990–993.

Primary Examiner—C. L. Albritton
Attorney, Agent, or Firm—Norman Rushefsky

[57] ABSTRACT

An improved squeegee roller particularly suited for use in an instant camera has a texture formed by stud-like bumps. A complex contour is provided to the roller by varying the heights of the bumps along the roller surface. In a method and apparatus for producing the roller a pulsed laser beam is used to produce the bumps and the energy of each pulse is varied according to a predetermined program to adjust the height of a bump formed.

5 Claims, 7 Drawing Sheets

METHOD AND APPARATUS FOR TEXTURING A ROLLER

This is a division of application Ser. No. 762,898, filed 8/6/85, now U.S. Pat. No. 4,734,729.

FIELD OF THE INVENTION

The invention, in general, relates to a method and apparatus for producing a textured roller, such as a squeegee roller. The squeegee roller has application in apparatus for spreading a fluid between layers of adjacent sheets of, for example, a photographic element or elements.

BACKGROUND OF THE INVENTION

Description of the Prior Art

Squeegee rollers for use in photographic apparatus, such as instant cameras, are well known. The EK-6 Instant Camera, for example, manufactured by the Eastman Kodak Company, Rochester, N.Y., is adapted to expose and initiate processing of so-called instant film units of the integral type. These film units each include a pod containing processing fluid. The pod is adapted to be ruptured, subsequent to a photographic exposure, upon introduction of the film unit into the squeegee rollers. As the film unit is driven through the nip of the squeegee rollers, the processing fluid is distributed within the film unit as a layer over image-forming areas of the film unit to initiate the processing of the photographic image. In order to distribute a uniform layer of the fluid processing composition within the film unit, it is well known to provide the rollers with various contours other than that of a right-regular cylinder. For example, in U.S. Pat. No. 4,319,827, there is shown an instant camera wherein one of the squeegee rollers is contoured with a crown configuration. To manufacture this roller according to the aforementioned patent, it is first necessary to machine a stainless steel roller to the crown shape. Thereafter, the roller is roughened or textured to increase its frictional characteristics by subjecting the roller to an electrical discharge machining (EDM) operation. This latter operation forms minute craters in the surface of the roller. In the process of forming these craters, the surface of the roller is subjected to bombardment by very high energy ions which cause surface and subsurface material on the roller to be displaced into an annular ridge that circumscribes each crater. This patent also teaches that the roughened surface of the roller can be adjusted so as to effect minor changes in fluid thickness control. In the EDM process, the operation contemplates the use of rapid pulsing of the EDM source while the roller is rotated and the source moved axially relative to the roller. The pulsing of the source for the treating of any one roller contemplates the use of a specific pulse on time period and employs a specific pulse current during such period. Minor differences in spread characteristics of one roller pair relative to another roller pair may be provided by treating the one roller pair such that they are subjected to a higher or lower pulse on time or alternatively a higher or lower pulse current.

One disadvantage with this method of manufacture is the extra expense required to machine rollers to form a crown or other complex contour prior to texturing the roller. It is therefore an object of the invention to provide an improved method and apparatus for manufacturing a textured roller having an effective complex contour without the need for machining the roller with a complex contour prior to the step of adding a texture to the surface thereof.

SUMMARY OF THE INVENTION

The invention further relates to a method and apparatus for producing a roller with a complex contour by impinging a beam of energy from an energy source upon the surface of the roller and wherein a parameter relating to the height of the bumps formed on the surface of the roller is varied in accordance with the diametral section being worked so that the average height of bumps formed on one diametral section of the roller surface is substantially different from the average height of bumps formed and located at a different diametral section.

BRIEF DESCRIPTION OF THE DRAWINGS

In the detailed description of the preferred embodiments of the invention presented below reference is made to the accompanying drawings wherein like reference numerals denote like elements and wherein.

DESCRIPTION OF THE PREFERRED EMBODIMENT

Because photographic apparatus such as cameras are well known, the present description will be directed in particular to elements forming part of, or cooperating more directly with the present invention, camera elements not specifically shown or described herein being understood to be selectable from those known in the art.

Figure 1:
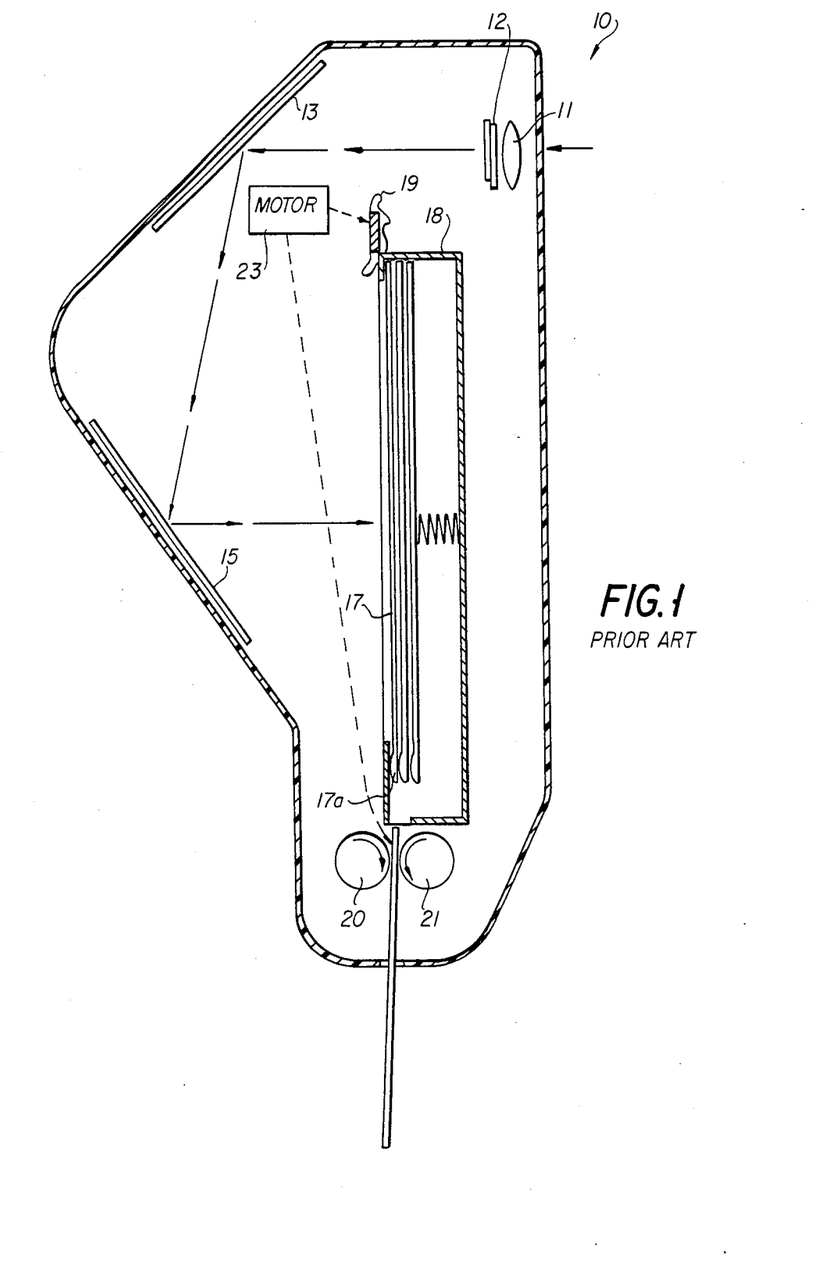
FIG. 1 is a diagrammatic elevational view of a prior art automatic self-processing camera in which the squeegee rollers made by the method and apparatus of the present invention may be used.
Figure 2:
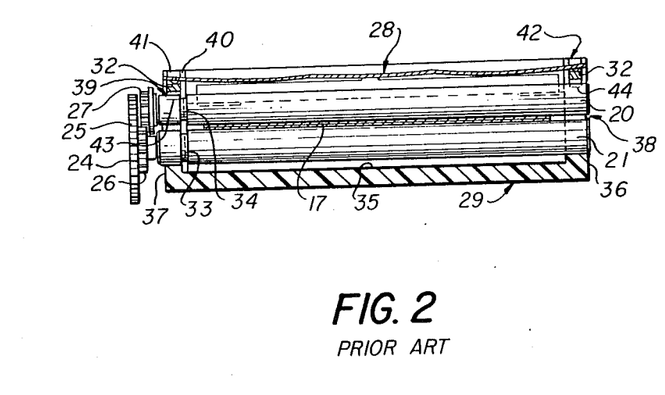
FIG. 2 is an elevational view of a squeegee roller assembly used in the camera of FIG. 1.

Referring now to the drawings and in particular to FIGS. 1 and 2 there is shown an instant camera 10 of the prior art described above and which includes a lens 11, a conventional exposure control element including a shutter 12, first and second mirrors 13 and 15 respectively, for increasing the effective focal length of the camera and directing the image onto an instant film unit 17 stored with other similar film units in a cartridge 18. The camera's shutter relase button (not shown) may be mechanically or otherwise coupled to the shutter by suitable conventional means and upon depression of the former, the shutter is opened to admit an appropriate amount of light to properly expose the film unit. As is known in conventional instant cameras, after exposure of the film unit, a picker device 19 is actuated to transport the film unit into the nip of a pair of driven squeegee rollers, 20, 21 which remove the film unit 17 from the camera 10 and while doing so maintain a flow of processing fluid across the image area of the film unit to thereby process same. To drive the squeegee rollers, the camera includes a motor 23 and suitable gearing, including gears 24–27 shown (see FIG. 2) which transmit drive from the motor to the pressure rollers 20, 21. The motor 23 may in turn receive its energy from a battery, not shown.

The instant film unit 17 is a multi-layered construction incorporating a rupturable pod 17a containing processing fluid. The rollers are resiliently urged toward each other by means of a spring 28 to apply pressure on the film unit. Once the exposed film unit is in the nip formed by the rollers, rotation of one or preferably both of the rollers continues the movement of the film unit between the rollers thereby rupturing the pod and spreading the developing fluid between the layers or adjacent sheets of the film unit. The rollers are textured or roughened to enhance their frictional engagement with the film unit.

As shown in FIG. 2 the squeegee roller assembly includes a frame 29, a pair of rollers 20 and 21, a pair of bearing blocks 32, a bow-shaped leaf spring 28, and gears 24–27.

Prior art rollers 20 and 21 are substantially identical, each having an annular groove 33, 34 respectively near one end. The frame 29 that holds the rollers in juxtaposed relationship has a base portion 35 slightly shorter than the length of the rollers 20 and 21 and two end portions 36 and 37 perpendicular to the base portion having U-shaped slots 38–39 respectively therein for rotatably receiving the ends of the rollers. A rib 40 on the inside edge of one of the slots engages the annular grooves 33, 34 of the rollers to prevent longitudinal motion of the rollers in the frame. When rotatably mounted in the frame, the rollers are free to undergo radial displacement from one another.

Bearing blocks 32 are received in recesses 41 and 42 in the frame and cover the open ends of the U-shaped slots 38 and 39. The bearing blocks each have a concave cylindrical surface that is complementary to the cylindrical surface of the roller 20 and is adapted to be engaged by pressure roller 20. The bearing blocks rest on the bottom surfaces 43, 44 of recesses 41 and 42 respectively and are out of contact with roller 30 when there is no film unit between the rollers.

Further details regarding the construction of the roller assembly may be found in U.S. Pat. No. 3,983,567 filed in the name of Kindig et al.

Figure 3:
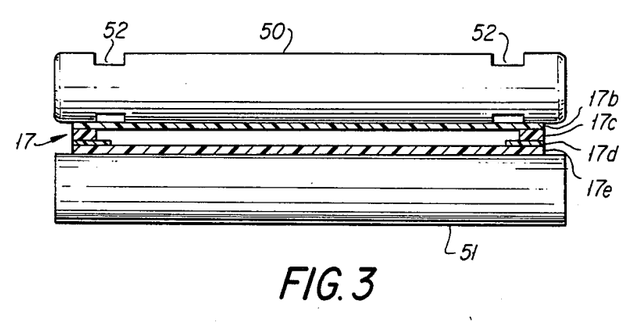
FIG. 3 is a diagrammatic elevational view of a pair of squeegee rollers one of which has a complex contour made in accordance with the teachings of the invention.

With reference now to FIG. 3 a portion of the working or squeegeeing areas of a squeegee roller assembly suitable for use in the camera of FIG. 1 is shown operating on a film unit. One of the rollers 50 includes a circumferential surface that has a complex contour on the area used for working or squeegeeing the film unit and the other 51 has the shape of a right-regular cylinder. It should be appreciated, however, that the contour, dimensions and illustration of the film shown are exaggerated to facilitate understanding of the invention. The film unit 17 such as KODAK Instant Color film PR 144-10 manufactured by Eastman Kodak Company, Rochester, N.Y. is of a multi-layered sandwich construction and includes a cover sheet 17b, side rails 17c, mask 17d and integral image receiving sheet 17e. The complex contour for the squeegeeing portion of roller 50 is shown provided with smaller diametral sections 52 forming circumferential notches in areas immediately opposite the masked areas of the side portions of the film unit. The notch which would only be several ten-thousandths of an inch in depth allows additional amounts of processing fluid to flow along the side portions of the film and thereby improves upon processing fluid distribution.

Figure 4:
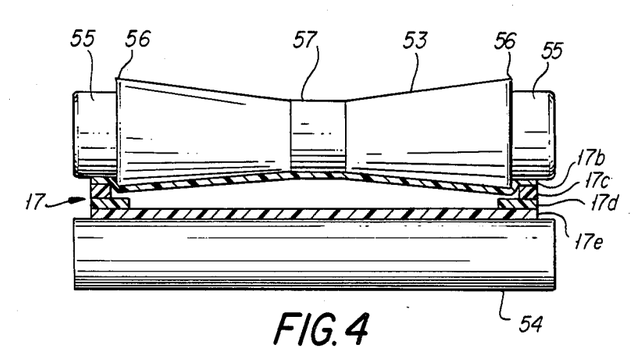
FIG. 4 is a similar view to that of FIG. 3 but illustrates a squeegee roller having a different complex contour than that shown in FIG. 3.

With reference now to FIG. 4, one squeegee roller 53 shown with a complex contour on its working or squeegeeing area (again shown exaggerated) includes smaller diametral sections which ride over the side portions of the film unit 17. Just inward of this is an enlarged diametral section 56 which is opposite the masked area of the film unit 17. Noting progressive diametral sections of the roller inboard of the sides of the film unit it may be seen that these sections taper or become smaller in diameter until the diametral section 57 overlying the center of the film unit is reached. Thus two tapers are formed in the effective diameters of the roller; the tapers providing larger diametral sections adjacent to the sides of the photographic film unit and smaller diametral sections adjacent to the center of the photographic film unit. The other squeegee roller 54 cooperating with roller 53 has a working surface in the form of a right-regular cylinder.

A description of a squeegee roller having a narrow central portion may be found in U.S. Pat. No. 4,460,255 filed in the name of Kozai et al. A roller having the configuration illustrated in FIG. 4 may be useful in a camera described in this patent for providing enhanced distribution of processing fluid.

Figure 6:
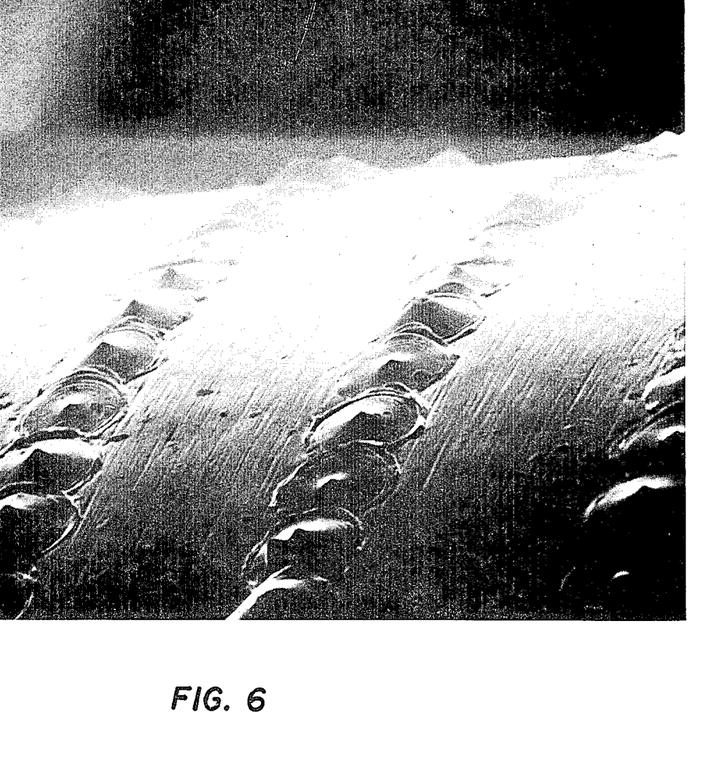
FIG. 6 is a photograph of the surface of a squeegee roller at 75 magnification.

With reference now to FIG. 6 a magnified view of a small portion of the surface of a squeegee roller is shown. The surface thereof includes a texture comprised of an orderly arrangement of stud-like bumps which project out from the surface and provide for effective gripping of a film unit when the film unit is engaged between a roller having these features and another roller with a texture formed by a sand blasting technique of the prior art. In addition to providing frictional engagement with the film unit the bumps such as shown in FIG. 6 may have their heights varied at appropriate diametral sections to form a roller with a complex contour such as shown in the examples illustrated in FIGS. 3 or 4.

Figure 5:
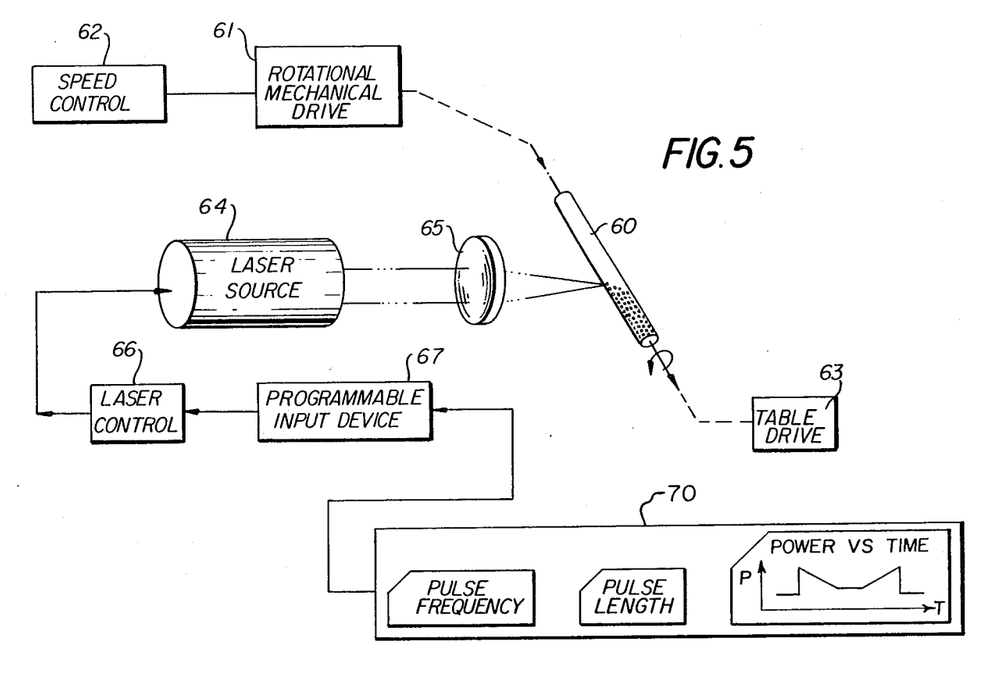
FIG. 5 is a diagrammatic perspective view of apparatus of the invention.
Figure 8:
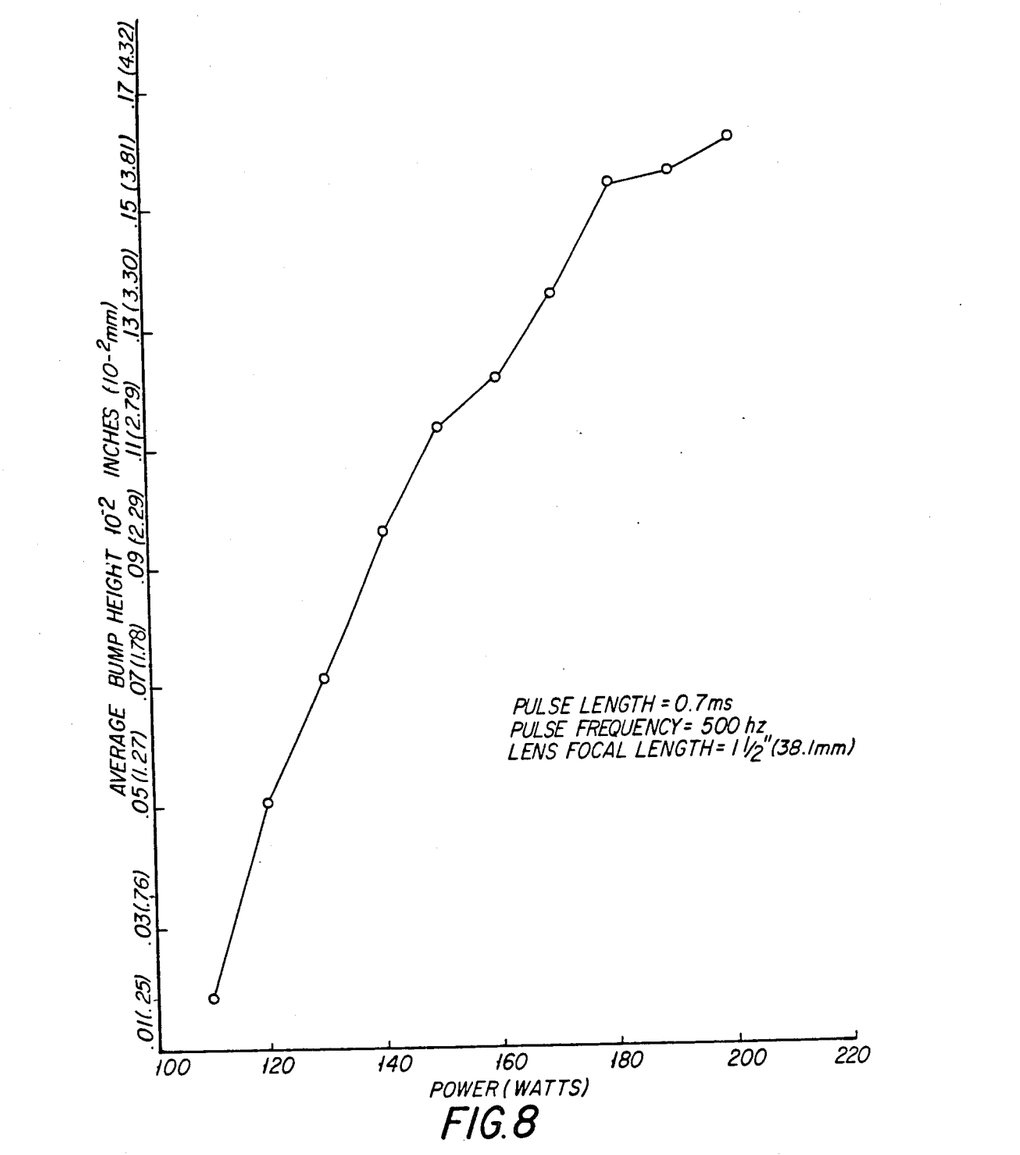
FIG. 8 is a hypothetical graph illustrating a relationship between parameters used in producing rollers using methods and apparatus of the invention.

The method and apparatus for forming squeegee rollers with a complex contour will now be discussed with regard to FIG. 5. A roller 60 to be textured in accordance with the invention is first machined by conventional means so that the surface used for spread control or squeegeeing portion is in the form of a right-regular cylinder of nominal diameter, for example, 0.375 inches (9.5 mm). Of course, other non-squeegeeing portions of the roller such as groove 34 (see FIG. 2) are preformed prior to the texturing operation. A preformed roller 60 is then mounted in a rotational mechanical driving device such as a lathe 61 whose rotational speed is controlled by a conventional speed control device 62. The lathe, in turn, is mounted on a translatable table (not shown) having a conventional programmable table drive 63 so that the roller can be simultaneously rotated about its longitudinal axis and translated at a controlled speed in the direction of its axis relative to a stationary laser source such as a 185 watt $CO_2$ pulsed laser source 64 which emits radiation in the far infrared of approximately 10.6$\mu$ wavelength. A zinc-selenide lens 65 focuses the beam onto the surface of the roller. Suitable conventional mask means may be used to prevent splattering material from reaching the lens. Air jets may be used to clear the immediate area of the roller being subjected to the beam to remove vaporized metal which might otherwise cause splattering. To reduce the possibility of splattering of material from adhering and creating unwanted bumps on the roller, the roller surface may be covered with a thin layer of a dried organic ink material such as that used in black felt tip marker pens sold under the trademark Magic Marker. Conventional controls 66 associated with the laser may be adjusted to provide a pulse length of 0.7 ms. and a pulse frequency of 500 Hz. The roller may be made to rotate at 197 rpm and the table speed adjusted to 0.06 in/sec (1.5 mm/sec) to provide a helix pitch of 0.018 inches (0.46 mm) between the rows of raised bumps shown in FIG. 6. A programmable input device 67 such as a programmable timer is coupled to the laser control 66 to adjust the power of the laser beam in accordance with the instantaneous bump height desired. To form a roller having a complex contour a programmable device may also be provided with a computerized control into which inputs such as desired pulse frequency, pulse length and the relationship of pulse power vs. time may be programmed either through appropriate inputs or in a production mode stored in the computer's read only memory. Outputs from the programmable device 67 are fed to the laser control and are used by the laser control to provide the desired beam parameters. With reference also to FIG. 8 it may be noted that a predetermined relationship exists between the various beam parameters and the particular type of roller used that will allow for average bump height to be varied with regard to beam power. For the roller 53 shown in FIG. 4 bump heights averaging 0.0004 inches (0.01 mm) may be used for the smallest diametral sections 55 and bump heights of 0.0015 inches (0.0381 mm) for the largest diametral sections 56. Although not every bump produced will be of the same height when the identical respective parameters are used, the bumps will tend to have heights which distribute about an average height which is proximate to that which has been predetermined through experiments using rollers of the same material composition. For any one rotation of the roller there are many bumps produced using the same power level and thus the bump heights along a diametral section tend to approach this predetermined average. As may be noted in the sketch of FIG. 5 the program for power vs time to produce the roller 53 of FIG. 4 is sketched. The beam power would be at a relatively low level to produce the smaller diametral sections 55 formed at the ends of the squeegeeing portion of the roller 53. The beam power is highest at the diametral sections 56 of the roller that will be opposite the mask layer of the film unit and diminishes (in accordance with a linear or curved function) as the center of the roller is approached by the beam. As may be noted in FIG. 8 stud-like bump heights of between about 0.0002 inches (0.005 mm) and 0.0015 inches (0.0381 mm) may be produced by varying the beam power level.

In order to produce the roller 50 having the complex contour shown in FIG. 3, a beam power that is suitable for forming the desired diametral section diameter for the larger dimension is used and then switched to a smaller beam power for producing the smaller or "notched" diametral sections 52. Alternatively, the beam power for these "notched" sections may be turned off so that no texture is produced at these points. In a design where no texture is to be produced at the notched sections this portion of the roller may be used for location of the bearing blocks 32 upon which the spring 28 resiliently urges the rollers together when a film unit is between them. Placement of the bearing blocks at this location will permit for some narrowing of the camera.

Figure 7:
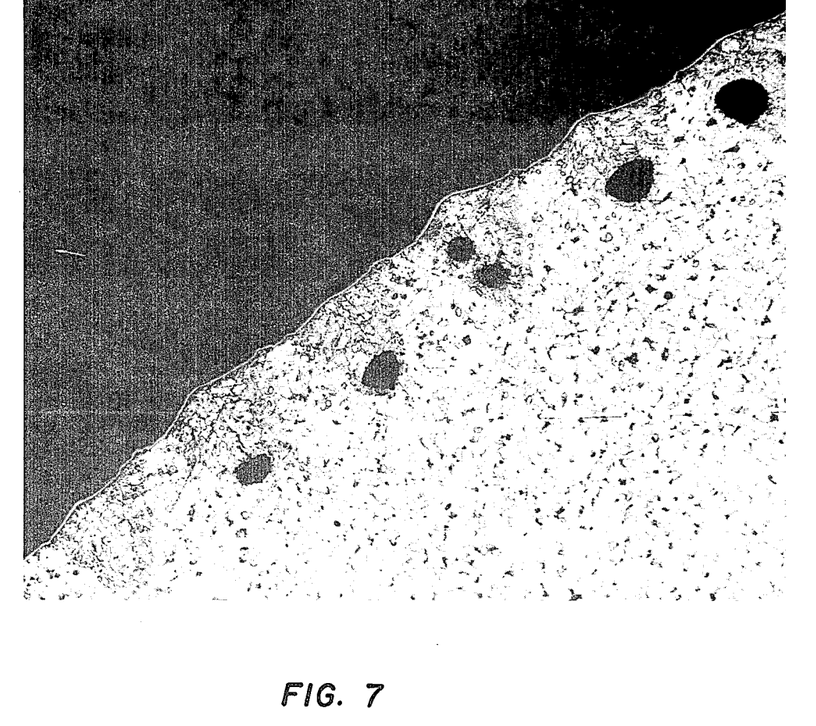
FIG. 7 is a photograph of a section of a squeegee roller showing portions immediately beneath the surface at 100 magnification.

Rollers made in accordance with the invention were sectioned and as shown in the FIG. 7 were found to have subsurface voids located beneath the bumps. In addition a chemical analysis of the bumps revealed a relatively high concentration of sulfur and manganese which are some of the lower vapor point elements included within the respective steel rollers used. It was further noted that these bumps did not appear on rollers which had no or low amounts of these elements. It is believed that as a laser beam strikes the roller the outer surface melts and sulfur and manganese from beneath the surface vaporize. After the beam has turned off and when the surface has cooled somewhat and solidified, the still vaporized sulfur and manganese generates sufficient pressure to form the surface bump. The material present in the bump is complemented by a subsurface void formed at the base of or beneath the bump.

Examples of suitable roller materials found to produce the bumps described herein were rollers manufactured from Carpenter AISI 182 FM stainless steel and AISI carbon steel grades 1213 or 1215. Carbon steel rollers subsequent to texturing as described herein may be covered with a thin nickel plating as known in the prior art. Although the preferred embodiments have been described with regard to texturing with stud-like bumps of only the complex contoured roller of a roller pair, the right-regular cylindrical rollers 51, 54 may also be textured with these bumps as well and preferably these bumps will have a uniform height. In such case the effective diameter of this roller will change and it would be desirable to reduce the effective diameters of their cooperating rollers 50, 53 respectively.

The invention has been described in detail with particular reference to preferred embodiments thereof, but it will be understood that variations and modifications can be effected within the spirit and scope of the invention.

We claim:

1. In a method of texturing a roller, the method including the steps of directing a laser beam upon the surface of a roller so that pulsed amounts of energy from the laser impinge upon the surface of the roller to form a plurality of discrete minute bumps upon the surface, the improvement comprising wherein the amount of energy impinging on the surface for forming each bump is varied according to the particular diametral section of the roller being textured and in accordance with a predetermined routine so that the average height of bumps formed by the laser and located on one diametral section of the roller surface is substantially different from the average height of bumps formed by the laser and located at a different diametral section to provide such sections with different effective roller diameters.

2. In a method for texturing a surface of a roller, the method including the steps of rotating the roller about the central axis of the roller, relatively translating an energy source to the surface so that the energy source is moved relative to the surface in a direction parallel to the axis, the energy source producing pulsed amounts of energy which impinge upon the surface to produce a texture on the surface comprising raised bumps, the improvement comprising:

adjusting a parameter of each pulse in accordance with the diametral section being subjected to energy from the energy source and in accordance with a predetermined program so that certain diametral sections having different average bump heights than other diametral sections are produced and thereby providing the roller with different effective roller diameters.

3. In an apparatus for texturing a surface of a roller, the apparatus including means for supporting the roller for rotation about the central axis of the roller, means for rotating the roller about the axis, means for impinging energy upon the roller for texturing the roller to form bumps thereon; the improvement comprising means for controlling the energy impinging upon the roller in a predetermined manner to provide a substantially different average height of bumps formed in some diametral sections as compared to bumps formed in other diametral sections to thereby form a roller having different effective roller diameters.

4. The apparatus of claim 3 and wherein the energy impinging means is a laser.

5. The apparatus of claim 4 and wherein the laser moves relative to the surface of the roller in a direction parallel to the axis of the roller to impinge energy from the laser on different diametral sections of the roller.

* * * * *